United States Patent [19]

Chaure

[11] Patent Number: 5,792,491
[45] Date of Patent: Aug. 11, 1998

[54] DEVICE FOR SEALING A PLASTIC CONTAINER PREFORM TO A BLOW MOULDING NOZZLE

[75] Inventor: Christophe Chaure, Le Havre Cedex, France

[73] Assignee: Sidel S.A., Le Havre Cedex, France

[21] Appl. No.: 776,464

[22] PCT Filed: Jul. 5, 1995

[86] PCT No.: PCT/FR95/00895

§ 371 Date: Jan. 10, 1997

§ 102(e) Date: Jan. 10, 1997

[87] PCT Pub. No.: WO96/01729

PCT Pub. Date: Jan. 25, 1996

[30] Foreign Application Priority Data

Jul. 11, 1994 [FR] France ............... 94 08699

[51] Int. Cl.[6] ............................. B29C 49/58
[52] U.S. Cl. .......................... 425/535; 425/534
[58] Field of Search .................... 425/526, 534, 425/535, 533

[56] References Cited

U.S. PATENT DOCUMENTS

| | | | |
|---|---|---|---|
| 4,678,425 | 7/1987 | Gibbemeyer | 425/535 |
| 5,340,302 | 8/1994 | Ingram | 425/535 |
| 5,498,152 | 3/1996 | Unterlander et al. | 425/534 |

FOREIGN PATENT DOCUMENTS

| | | | |
|---|---|---|---|
| 2306766 | 11/1976 | France | 425/535 |
| 2 004 805 | 4/1979 | United Kingdom . | |
| 2 114 502 | 8/1983 | United Kingdom . | |

*Primary Examiner*—Robert Davis
*Attorney, Agent, or Firm*—Sughrue, Mion, Zinn, Macpeak & Seas, PLLC

[57] ABSTRACT

A machine for blow moulding or stretch-blow moulding a preform (5) in a mould (6), wherein an O-ring seal (20) is provided between the preform and the blow moulding nozzle (1). The seal is mounted on the nozzle and can be moved between two positions, i.e., a first position in which it is prevented from contacting the preform during the insertion of the nozzle into the preform, and a second position in which it forms the seal therebetween. Members (18, 21, 26, 27) are provided for moving the seal from the first to the second positions once the nozzle has been fully positioned within the preform.

10 Claims, 3 Drawing Sheets

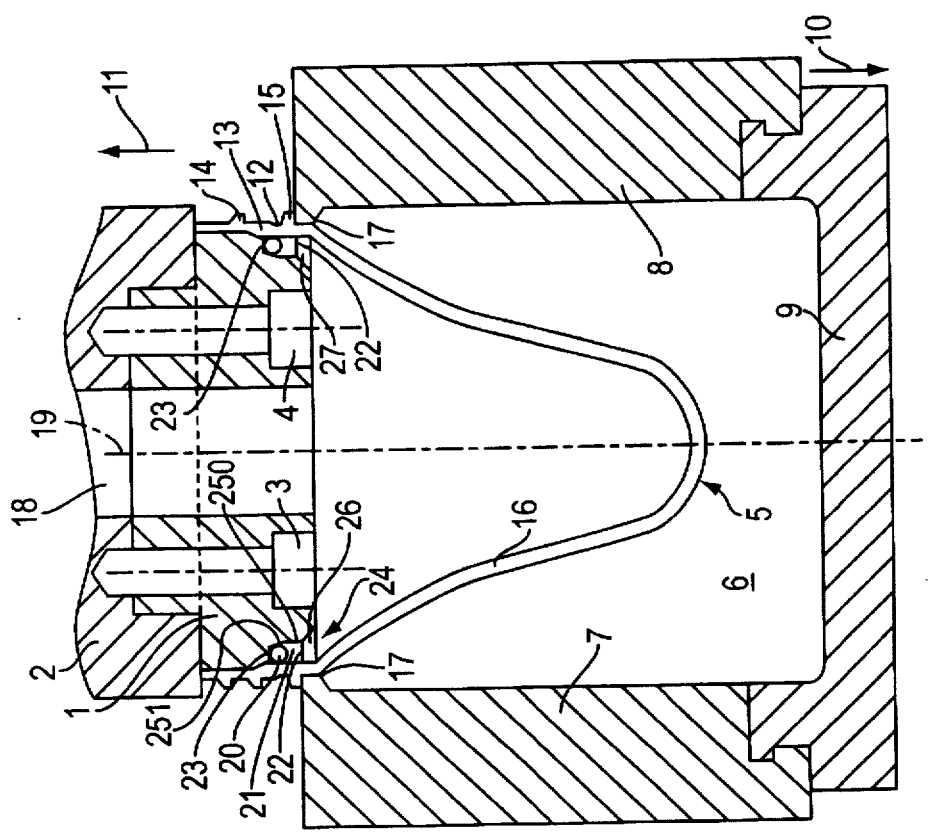
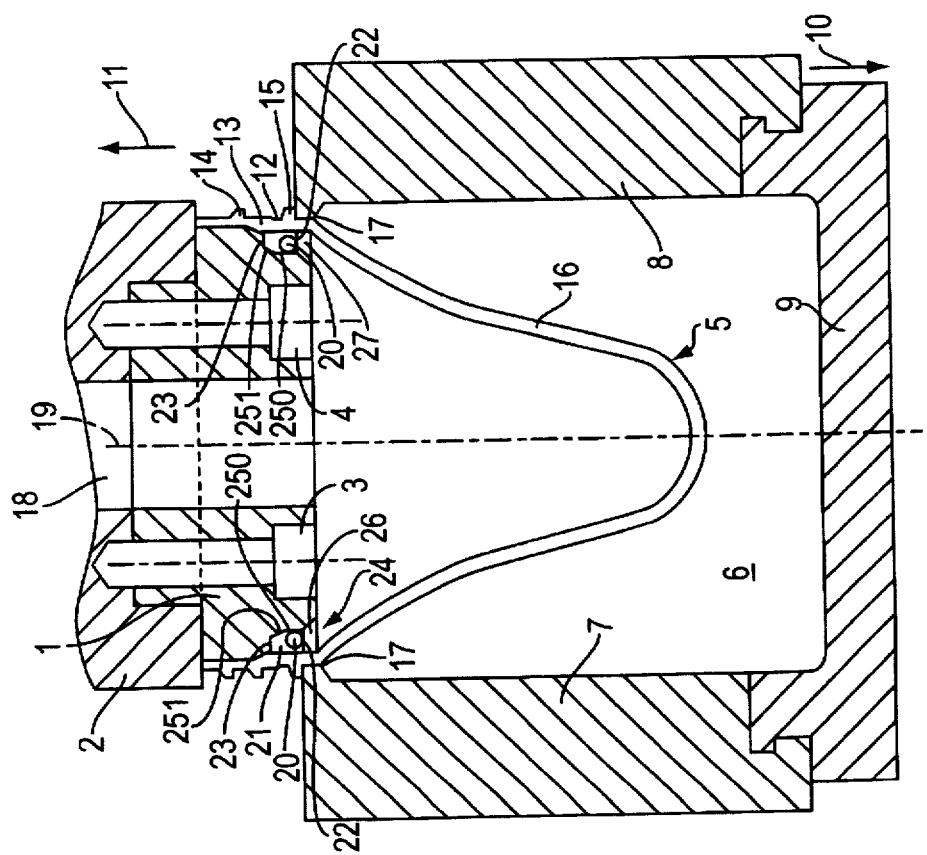

5,792,491

DEVICE FOR SEALING A PLASTIC CONTAINER PREFORM TO A BLOW MOULDING NOZZLE

BACKGROUND OF THE INVENTION

This invention concerns a device intended to ensure impermeable sealing between the rough form of a plastic container and a blower nozzle in a machine for manufacturing containers by blowing or by stretching/blowing these rough forms.

The state of the art encompasses machines for the manufacture of plastic containers, each of which machines incorporates, in succession, a preform-feed section, a preform-handling section, a thermal treatment oven, a heated perform-handling section, a unit comprising molds equipped with means allowing blowing of the containers (normally after a stretching operation), a section for handling each container, and a container-output section.

The type of machine described above allows manufacture of a final container from a preform by implementing a single blowing step.

Conventional knowledge also encompasses machines allowing container manufacture using so-called "double blowing" procedures. Such a procedure, for example that described in commonly assigned French Patent No. 2 658 119, requires the use of two stations, each of which is equipped with a machine derived from the machine described above, these two stations being connected by a conveyor.

Container manufacture includes the following steps, which are described in detail in the aforementioned French patent:

1. At the first station: heating of a preform, then blowing (stretching/blowing) of a semi-finished container;
2. Transfer by conveyor of the semi-finished container to the second station;
3. At the second station: special heat treatment applied to the semi-finished container, then blowing of the final container.

The details of the manufacturing steps and the advantages of one method as compared with another are well known to those skilled in the art and do not constitute the object of the invention in question. They will, therefore, not be described in greater detail.

To further an understanding of the invention, it will be recalled that a preform is normally produced by injecting a plastic material in a suitable mold. The design of the preform and the quantity of material necessary for its manufacture depend on the design of the container to be blown. However, the basic structure is the same; that is, the perform exists as a tube open at one of its ends and sealed at the other.

The open end and an immediately-adjacent area form the neck of the preform. The shape of the neck is normally the final one and corresponds to the shape of the neck (the neck of a bottle) of the finished container. Accordingly, this shape is not modified during the subsequent blowing step(s).

Thus, if the preform is intended to yield a container to be sealed by a threaded plug, the neck is provided at the time of injection with threading having its final shape and dimensions. If, on the other hand, the container is to be sealed using a stopper, the preform neck is produced in a suitable shape and appropriate dimensions.

Furthermore, the design of the preform is such that it is easily unmolded from the injection mold. In most cases, the shape of at least the body is tapered, as a truncated cone having a larger diameter at the neck than at the bottom.

The sealed end forms the bottom of the preform, and the section extending between the bottom and the neck forms the body thereof.

Knowledge of the existence of an area called the shoulder of the preform, located between the neck and the body, and knowledge of the way in which the material composing the body and the bottom of the preform is distributed so as to form the body and the bottom of the finished container are not needed in order to understand the invention under consideration.

In the remainder of the description, the term "rough form" will be used to designate both a preform and a semi-finished container. In fact, a preform constitutes a rough form for the final or for the semi-finished container, depending on whether it is used in a single blowing or double blowing machine. Similarly, in a double blowing machine, the semi-finished container constitutes a rough form of the finished container.

Furthermore, in the rest of the description, the term "container" will be used to designate both a semi-finished container produced during a double blowing process (and thus from a rough form existing as a preform) and a finished container produced either in a double blowing process (thus from a rough form existing as a semi-finished container) or in a single blowing process (and thus from a rough form existing as a preform).

To transform a rough form into a container, a fluid must be injected at high pressure into the rough form. The fluid used is normally air, and blowing pressures range between several and several tens of bars, and typically about forty bars for blowing bottles on the Assignee's machines. Tests have even been conducted using much higher pressures.

The fluid is injected into the rough form using a blowing nozzle. The latter comprises at least one orifice through which the pressurized fluid is fed into the rough form, and this orifice is, moreover, connected to a fluid-feed source, such as a compressor, a tank, or any other suitable device.

Conventional nozzles comprise a blowing snout, which is inserted in the mouth of the neck of the rough form during blowing. This snout is normally tapered, the diameter at the base of the truncated cone being slightly smaller than, or equal to, the diameter of the mouth of the neck of the rough form, and the diameter at the vertex thus being even smaller. The vertex of the truncated cone is a free end of the nozzle, while the base of the truncated cone is connected to the machine and, therefore, to the fluid-feed source, by means of a nozzle body. The body and snout of the nozzle may be machined from the same or from different parts, one being mounted on the other in this latter case. A machined annular protuberance, or a cheek formed by the face of the body in contact with the nozzle snout, encircles the entire base of the nozzle. This protuberance, or cheek, is designed, on the one hand, to restrict the depth of insertion of the snout into the rough form and, on the other, to provide an impermeable seal between the interior and exterior of the rough form at the time of blowing.

To this end, after the rough form has been placed in the mold, the nozzle snout is inserted into the mouth until the protuberance or cheek comes into contact with the drinking/pouring edge of the rough form, and a determinate supporting force is generated in order to counterbalance the blowing pressure.

However, this structure has disadvantages, since it does not always provide absolute impermeability, a fact which, depending on the case, may cause either reduced efficacy or complete inefficacy of the blowing operation.

Indeed, since impermeability is provided basically by the pressure exerted between the drinking/pouring edge and the cheek, or protuberance, a surface defect on this edge, such as a hollow space, produced, for example, by an impact during storage of the preforms, or a slight deficiency of material at the time of injection, or a defect of the surface evenness of the edge may cause leakage. The risks increase as the neck diameter increases.

One solution could lie in attaching a joint to the nozzle so that it is interposed between the cheek or protuberance and the drinking/pouring edge. Compression and destruction of the joint would very rapidly occur, on the one hand because a pronounced supporting force would have to be generated in order to counterbalance the strong blowing pressures and, on the other, because of the repetitive nature of the blowing operations. It is noted, in fact, that using the Assignee's machines, more than one thousand containers per hour can be blown in each mold. In other words, this means that a nozzle must be matched up in succession with more than one thousand rough forms per hour.

SUMMARY OF THE INVENTION

Accordingly, the invention concerns a device which, on the one hand, reliably ensures impermeability between a blowing nozzle and each rough form with which it is to be matched up, and, on the other, effectively stands up to repeated use.

According to the invention, a device ensuring impermeability between a blowing nozzle and a rough form and used in a container-blowing machine, the rough form comprising a neck and a mouth remaining unchanged during the blowing phase and the nozzle being inserted into the mouth prior to blowing and removed thereafter, is characterized by the fact that this device comprises impermeable sealing means borne by the nozzle and configured so as to be capable of adopting at least two positions, a first position which prevents them from being in contact with a rough form when the nozzle is put in place, and a second position in which these means ensure impermeability between the rough form and the nozzle, and by the fact that the device incorporates a mechanism by virtue of which the sealing means are moved from the first to the second position after the nozzle has been completely inserted in the rough form.

Accordingly, since the impermeable sealing means do not come into contact with the rough form during positioning of the nozzle, they cannot deteriorate during this phase. Furthermore, since they are placed in the second position only after the nozzle has been completely inserted in the rough form, they cannot, under any circumstances, be compressed between the edge of the neck of the rough form and a portion of the nozzle, so that they do not undergo a compression or cutting action generated between the edge and the nozzle.

As a result, the goals of the invention are achieved in an extremely simple manner.

According to another invention feature, the device is configured so that the sealing means automatically return from the second to the first position when the nozzle is retracted, and they remain stably in this first position as long as the nozzle has not been completely inserted in a new rough form.

Thus, the sealing means cannot move accidentally into the second position as long as a new rough form is not in place, thereby increasing still further the reliability of the device.

According to another feature, the sealing means are shifted from the first to the second position by means of the preblowing fluid when preblowing is carried out, or by means of the blowing fluid when no preblowing occurs.

Thus, no related mechanical device is required, thereby reducing manufacturing costs and making the device simpler.

According to another feature, the sealing means are borne by the nozzle snout.

BRIEF DESCRIPTION OF THE DRAWINGS

Other features and advantages of the invention will emerge from a reading of the following description provided with respect to the attached drawings, in which:

FIGS. 3 and 4 are schematic cross-sections of a portion of a machine equipped with a device according to the invention and to a second embodiment and illustrating the sealing means in their first (FIG. 3) and second (FIG. 4) positions, respectively.

DETAILED DESCRIPTION OF THE PREFERRED EMBODIMENTS

Figure 1:
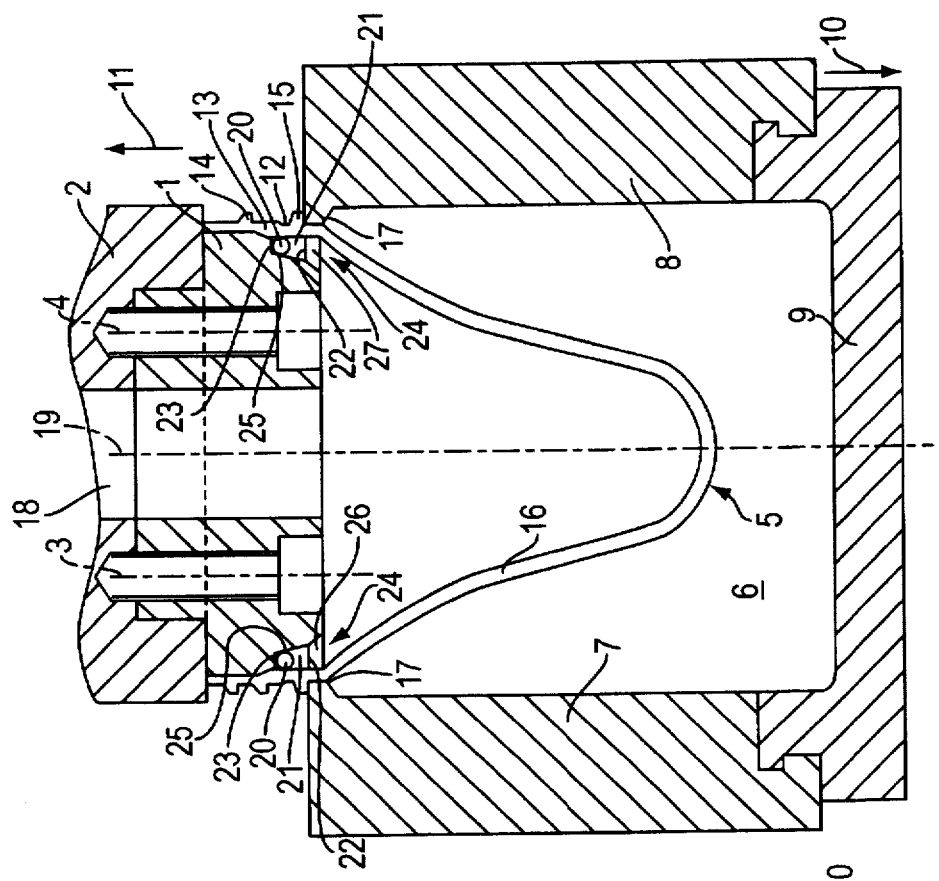
FIGS. 1 and 2 are schematic cross-sections of a portion of a machine equipped with a device according to the invention and to a first embodiment, illustrating the sealing means in their first (FIG. 1) and second (FIG. 2) positions, respectively.
Figure 2:
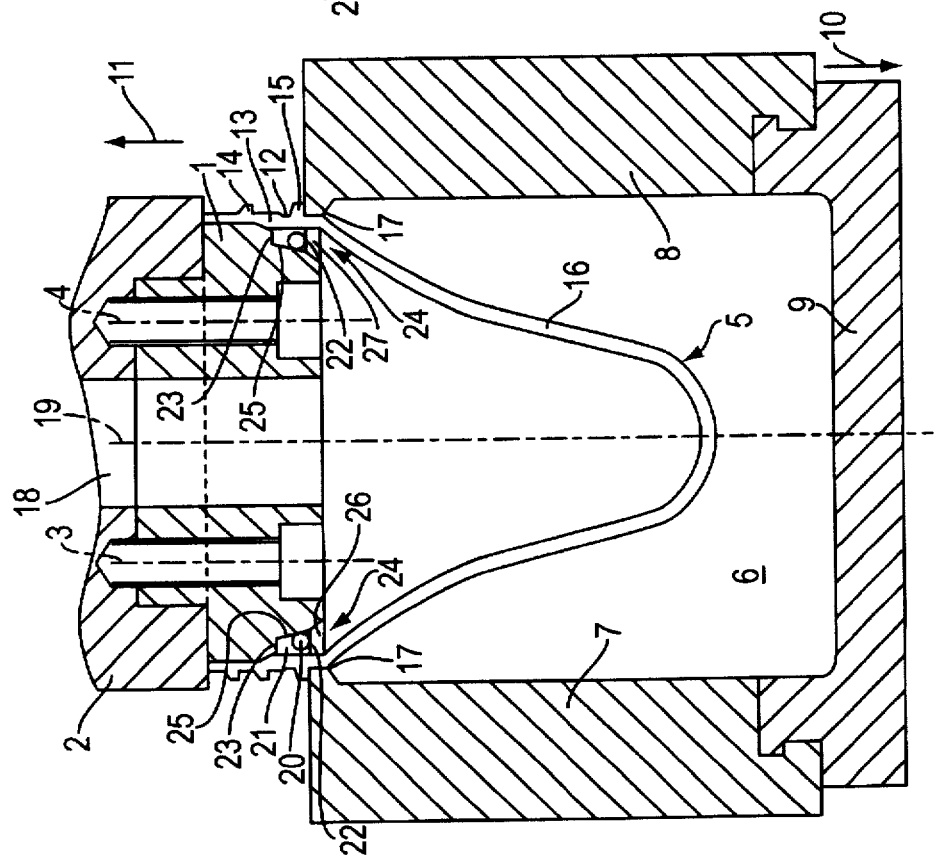

The portion of the machine shown in FIGS. 1 and 2 comprises a nozzle set on a base 2 connecting it to the frame (not shown) of the machine, for example using screws 3, 4.

The snout of the nozzle 1, that is, the components thereof designed to penetrate into the mouth of the neck of a rough form in order to allow the blowing thereof, is shown in these figures in the position of insertion in a rough form 5 which, in the example illustrated, is a preform used to produce a jar. The rough form 5 is, moreover, shown positioned in a blowing mold 6 conventionally comprising two half-molds 7, 8 and a mold bottom 9. Various conventional means (not shown) make it possible to move the two half-molds 7, 8 apart, to move the mold bottom 9 away in the direction of the arrow 10, and to move the nozzle 1 away in the direction of the arrow 11 when a new rough form is put in place or when the container is moved away.

Conventionally again, the positioning of a rough form or the removal of a container take place, for example, using transfer clamps (not shown), which grip the rough form or container, for example in the area of an annular recess 12 formed in the neck 13 of the rough form or container. It will be recalled that the neck is shaped to its final form and dimensions when the rough form 5 is produced, and, accordingly, that the annular recess of the container is identical to the recess 12 of the rough form.

In the example shown, threading 14 surrounds the neck 13 between its edge and the annular recess 12. It allows a cap to be screwed onto the finished container.

Of course, instead of threading, any other mechanism can be used to allow fastening of any other type of sealing device.

Finally and conventionally also, a collar 15 surrounds the portion of the neck 13 the most distant from the edge, that is, in the example shown, the portion located beyond the annular recess 12.

In conventional fashion, the neck 13 and the collar 15 are positioned outside the mold 6, while the body 16 of the rough form 5 is positioned inside during the blowing operations. To this end, when the half-molds 7, 8 and the bottom 9 of the mold are in the blowing position, the mold incorporates an opening 17 opposite the mold bottom 9 in order to allow the positioning of the rough form 5 in the position just indicated in relation to the mold. When the nozzle 1 is in place, the collar 15 is supported on the outer edge of the opening 17 of the mold, thus preventing the rough form 5 from being driven inside the mold by the action of the elongation (or stretching) rod and by the effect of the high blowing pressures.

Finally, and conventionally also, the nozzle 1 incorporates an opening 18 centered on its axis 19 and allowing the passage, first, of the elongation rod (not shown in FIGS. 1 and 2) and second, of the blowing fluid.

In accordance with the invention, the nozzle 1 is equipped with a device incorporating impermeable sealing means that can occupy two positions, a first position illustrated in FIG. 1 and a second, illustrated in FIG. 2.

In the example illustrated in FIGS. 1 and 2, the sealing means are constituted by an O-ring 20 placed in an annular recess or groove 21 machined on the periphery of the nozzle 1. The groove is located in an area of the nozzle 1 positioned opposite the inner wall of the neck 13 of the rough form 5 when the nozzle 1 is completely inserted in the neck 13.

In the example illustrated in FIGS. 1 and 2, the groove 21 comprises two opposite, parallel walls 22, 23 perpendicular to the central axis 19 of the nozzle.

The first wall 22 is set in proximity to the free end of the nozzle snout; that is, the end inserted in the mouth of the neck.

The second wall 23 is, therefore, located between the first wall 22 and the upper end of the nozzle 1 connected to the base 2.

In fact, the first wall 22 is formed by an annular edge 24 enclosing the free end of the snout of the nozzle 1. This edge is produced when the groove is machined. As illustrated in FIGS. 1 and 2, the periphery of this annular edge 24 is chamfered or inwardly inclined in relation to the central axis 19 of the nozzle, so that the outer diameter of this annular edge as measured in proximity to the free end of the nozzle 1 is smaller than the diameter measured at the groove 21.

Thus, in the embodiment shown in FIGS. 1 and 2, the periphery of the annular edge 24 is tapered, the basic plane of the truncated cone falling in the area of the first wall 22 and the plane of the vertex of the truncated cone merging with the plane of the free end of the nozzle.

Finally, the largest diameter of the periphery of the annular edge, i.e., the diameter at the base of the truncated cone in the example shown in FIGS. 1 and 2, is very slightly smaller than the inner diameter of each part of the neck 13 of the rough form 5 that must travel opposite this edge when the nozzle 1 is positioned in the mouth of the neck 13.

This composite structure joining the shape of the periphery of the annular edge and the largest diameter of this edge allows ease of insertion and of removal of the nozzle 1 into the neck 13, without damage to the neck.

A third wall 25 forming the bottom of the groove connects the first two walls. This third wall, or bottom, 25 is inclined in relation to the axis 19 of the nozzle 1, in such a way that the depth of the groove 21 in proximity to the first wall 22 is greater than the depth in proximity to the second wall 23. In addition, the distance between the first 22 and second 23 walls of the groove 21 exceeds the thickness of the joint, with the result that the O-ring 20 can be moved within the groove from the first to the second wall, and vice-versa.

Furthermore, the depth of the groove 21 in proximity to the first wall is such that, when the O-ring is simultaneously in contact with the first wall 22 and the bottom 25 of the groove, it is completely hidden in the groove, that is, it is entirely masked by the annular edge 24, as illustrated in FIG. 1.

In one embodiment of the invention, the inner diameter of the O-ring 20 is such that, when it is in contact with the first wall 22 of the groove 21, it freely encircles the bottom wall 25; in other words, it is not stretched by this wall. On the other hand, as soon as it is moved toward the second wall 23, it very rapidly comes to be supported increasingly markedly on the bottom wall 25, because of the gradual reduction of the depth of the groove 21 between the first 22 and the second 23 walls, this reduction producing as a consequence a gradual increase of the diameter of the area of the nozzle 1 constituting the bottom 24 enclosed by the O-ring.

In a variant, the O-ring 20 is supported on the bottom wall 25 and is thus stretched to a greater or lesser extent, even when it is in contact with the first wall 22. As a result, the more the O-ring is shifted toward the second wall, the more pronounced the support generated on the bottom.

In addition, whatever the state (stretched or unstretched) of the O-ring 20, when in contact with the first wall 22, the depth of the groove 21 and the thickness of the O-ring are such that, when a rough form 5 is readied and the O-ring is gradually moved away from the first wall 22 to be drawn closer to the second wall 23, while continuing to rest on the bottom 25, it protrudes from the groove 21 and, accordingly, from the periphery of the nozzle snout, and then comes into contact with the inner wall of the neck 13 of the rough form 5. Thus, since the O-ring is wedged between the groove bottom 25 and the inner wall of the neck of the rough form, impermeability is ensured.

FIG. 2 illustrates the second position of the O-ring, that is, the sealing position just described. Except for this second position, FIG. 2 includes the same elements and the same references as FIG. 1.

The movement of the O-ring from the first to the second position is achieved using the preblowing fluid, when preblowing is performed, or the blowing fluid. It will be recalled that the fluid is injected into the rough form 5 through the central orifice 18 of the nozzle, which also allows penetration of an elongation rod (not shown, since it is conventionally known and not encompassed by the invention).

To enable the fluid to push against the O-ring, it must be able to infiltrate easily into the groove 21. To this end, the edge 24 on which the first wall 22 is produced is fitted with slots and/or holes and/or any other means allowing a part of the fluid injected into the rough form to infiltrate into the groove and to push the O-ring toward the second position, by virtue of the pressure exerted by the fluid.

Preferably, the slots, holes, and/or other means are evenly spread out and sufficiently numerous on the periphery of the edge 24, so that the O-ring can be evenly pushed back at all points on the periphery thereof.

The cutting or diametrical section plane in FIGS. 1 and 2 passes through the middle of two diametrically-opposed slots 26, 27 drawn on these figures (non-cross-hatched areas of the edge 24 beneath the first wall 22).

Figure 5:
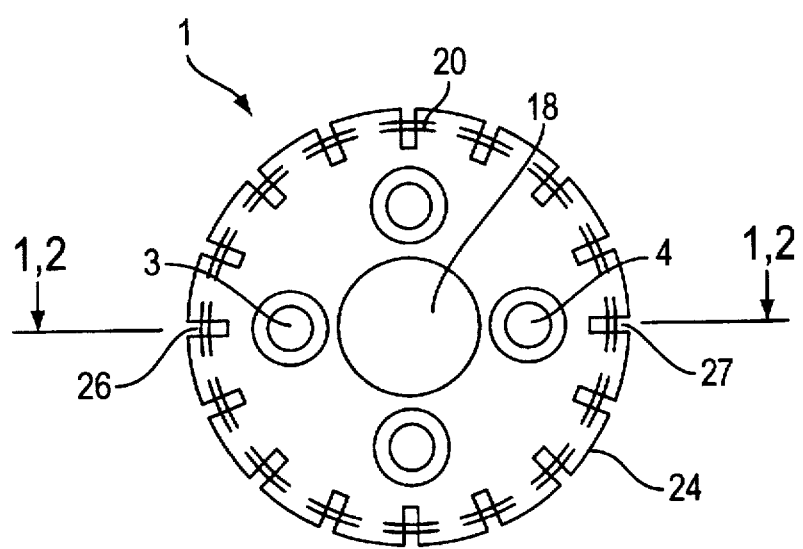
FIG. 5 illustrates the end-piece of a nozzle equipped with a device according to the invention, this end-piece being designed to be inserted in the mouth of a rough form.

FIG. 5 is a front view of a possible embodiment of the free end of a nozzle snout, whose peripheral edge forming the first wall 22 (not visible in this figure, since it is located behind the other) is provided with slots evenly spread out on its periphery. Supposing that this embodiment is the one applicable to the device in FIGS. 1 and 2 and that the section plane in FIGS. 1 and 2 is formed by the line A—A shown in FIG. 5, this figure includes the peripheral edge 24, the central orifice 18 of the nozzle, the two screws 3 and 4, and the two slots 26, 27 mentioned above.

In the example illustrated, a total of sixteen slots are visible. The number thereof may vary depending on the diameter of the nozzle snout, a smaller-diameter snout not allowing as many slots as does a larger-diameter one.

When fluid pressure is applied, the O-ring 20 travels on the tapered slope delimiting the groove bottom and ultimately becomes wedged between the groove bottom 21 and the inner wall of the neck of the rough form, thus ensuring impermeability.

When fluid pressure is relaxed after blowing of the container, the O-ring remains in place, since it is wedged there.

The return to the first position is caused quite simply by the removal of the nozzle from the neck. Since, after blowing, the O-ring remains wedged between the rough form and the nozzle, the movement of retraction naturally causes the relative movement of the O-ring 20 in relation to the rough form, one the one hand, and the nozzle on the other, this movement on the rough form occurring spontaneously toward the first wall 22, that is, toward the first position.

FIGS. 3 and 4 illustrate a second embodiment of the invention. They are identical to each other, with the exception of the position of the O-ring. FIG. 3 illustrates the case in which the O-ring does not provide impermeability, while FIG. 4 illustrates the case in which it does ensure impermeability.

Furthermore, the difference between the embodiment shown in FIGS. 3 and 4 and the embodiment illustrated in FIGS. 1 and 2 is a minimal one. This difference involves only the shape of the groove, in particular the shape of the bottom of this groove. Thus, the same elements as those shown in FIGS. 1 and 2 bear the same references and are not described a second time.

The groove 21 is delimited by a first wall 22, a second wall 23, and a bottom 250, 251.

Instead of being formed by a tapered edge like that in FIGS. 1 and 2, the bottom is formed from two parts. A first part 250 is formed by a truncated cylinder centered on the axis 19 of the nozzle.

The second part 251 connects the first part 250 and the second wall 23 of the groove. This second part 251 is tapered. The vertex of the truncated cone is formed by the junction of the first and second parts and the base of the truncated cone is borne by the second wall 23.

The height of the first cylindrical part 251 as measured between the first wall 22 and the second tapered part 251 is at least equal to one-half of the thickness of the O-ring 20.

Thus, in the embodiment illustrated in FIGS. 3 and 4, the height of this first part 250 is approximately equal to three-quarters of the thickness of the O-ring 20.

At the moment of blowing, the presence of this cylindrical part 250 causes this O-ring 20 to accelerate, thereby helping it to travel more easily from the first to the second position, while, with respect to the embodiment in FIGS. 1 and 2, it immediately undergoes deceleration resulting from stretching caused by the purely tapered shape of the groove bottom.

The description of FIG. 5 in conjunction with FIGS. 1 and 2 is also applicable to FIGS. 3 and 4, if it is supposed that the nozzle snout shown in FIG. 5 is also applicable to the device in FIGS. 3 and 4. Accordingly, it is not necessary to repeat this information, just as it is not necessary to repeat the description of the operation of the device in FIGS. 3 and 4, which is completely identical to that portrayed in FIGS. 1 and 2.

The invention thus makes it possible to solve, in simple fashion, all of the impermeability problems occurring at the moment of blowing between a rough form and a nozzle. The sealing means, such as the O-ring 20, are not subjected to a static action, such as the bearing pressure of a drinking/pouring edge, capable of damaging them. They act only under the effect of the dynamic pressures encountered during blowing. Furthermore, removal of the container cannot damage them.

Of course, the invention is not limited to the embodiments described and claimed below. It encompasses all variants within the capability of those skilled in the art. Thus, for example, the shapes of the groove bottoms as described must not be held to be restrictive, the main point being that the impermeable sealing means occupy a position in which they are not in contact with the rough form during insertion of the nozzle. Accordingly, for example, curved bottoms instead of tapered groove bottoms may be considered.

I claim:

1. A device for establishing an impermeable seal between a blowing nozzle (1) and a rough form (5) of a container in a container-blowing machine, the rough form comprising a neck (13) and a mouth not altered during blowing, the nozzle being inserted in the mouth prior to blowing and retracted thereafter, said device comprising impermeable sealing means (20) disposed on the nozzle and displaceable between two positions, a first position whereat said sealing means is not in contact with a rough form when the nozzle is being inserted therein, and a second position whereat said sealing means establishes an impermeable seal between the rough form and the nozzle, and fluid pressure application means (18, 26, 27) for moving the sealing means from the first position to the second position after the nozzle has been completely inserted in the rough form, wherein the sealing means remains in the second position when fluid pressure is reduced following a blowing operation, and wherein the sealing means returns automatically from the second position to the first position when the nozzle is retracted from a rough form.

2. A device according to claim 1, wherein the sealing means (20) is moved from the first position to the second position by a preblowing fluid when preblowing is carried out, or by a blowing fluid when no preblowing operation is performed.

3. A device according to claim 1, wherein the sealing means is disposed on a snout of the nozzle adapted to be inserted into the neck (13) of the rough form.

4. A device according to claim 3, wherein the sealing means comprises an O-ring (20) disposed in an annular groove (21) in the periphery of the snout of the nozzle, the groove (21) being delimited by a first lateral wall (22) proximate a free end of the snout of the nozzle, by a second lateral wall (23) more distant from the free end than the first wall (22), and by a bottom (25; 250, 251) connecting the two walls, the distance between the two lateral walls (22, 23) being greater than the thickness of the O-ring, so that the O-ring can be moved toward one or the other of the lateral walls, the depth of the groove at a junction between the first lateral wall and the bottom being such that when the O-ring is in the first position on the bottom and against the first wall, it is completely disposed in the groove and the depth of the groove at a junction between the second wall (23) and the bottom (25; 250, 251) being such that, when the O-ring is moved toward the second wall it emerges from the periphery of the nozzle and is in contact simultaneously with the rough form and with the bottom of the groove.

5. A device according to claim 4, wherein the nozzle (1) is drilled with at least one orifice (18) opening in the free end of the snout thereof to allow injection of the fluid into the rough form, wherein the first wall (22) is formed by an annular edge (24) on the periphery of said free end, and wherein said edge is provided with at least one orifice or slot (26, 27) to transmit pressurized fluid from the rough form into the groove (21) to push the O-ring from the first position to the second position.

6. A device according to claim 5, where in the edge (24) is provided with a plurality of orifices (26, 27) evenly distributed around a periphery thereof.

7. A device according to claim 4, wherein the bottom (25) of the groove is tapered, the base of a truncated cone being formed by the junction of the bottom with the second wall (23), and the vertex of said cone being formed by the junction of the bottom with the first wall (22).

8. A device according to claim 4, wherein the groove bottom incorporates two parts, a first, cylindrical part (250) and a second, tapered part (251), the first part is positioned between the first wall (22) and the second part (251), the second part is positioned between the second wall (23) and the first part (250), the base of the truncated cone is formed by the junction between the second part (251) and the second wall (23), and a vertex of the truncated cone is formed by the junction between the second part and the first part.

9. A device according to claim 8, wherein the height of the cylindrical part (250) is equal to at least one-half of the thickness of the O-ring.

10. A device according to claim 1, wherein the sealing means comprises an O-ring disposed in an annular groove (21) formed in an outer periphery of a snout of the nozzle, and wherein a bottom of the groove defines a direction of travel of the O-ring between the first position and the second position, said direction of travel being oblique to an axis of the nozzle.

* * * * *